Sept. 9, 1947. R. SCHILLING ET AL 2,427,162
TRACK DRIVE
Filed April 24, 1944 2 Sheets-Sheet 1
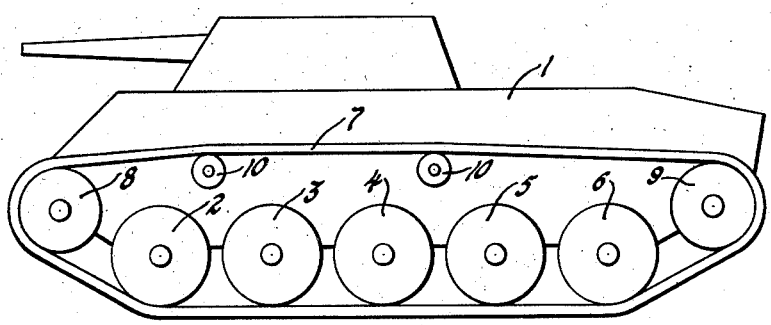
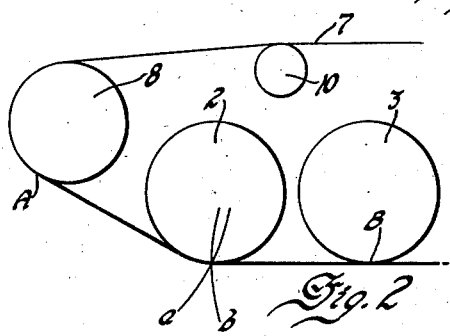
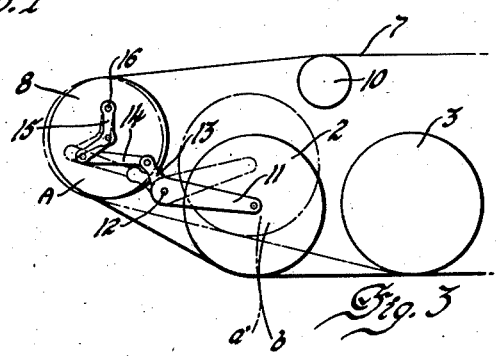
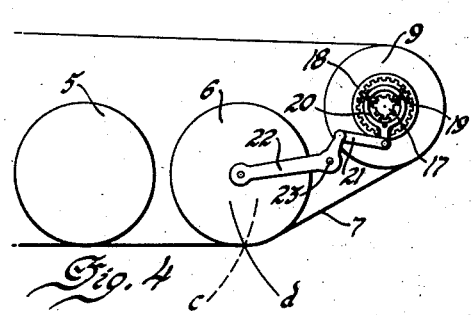
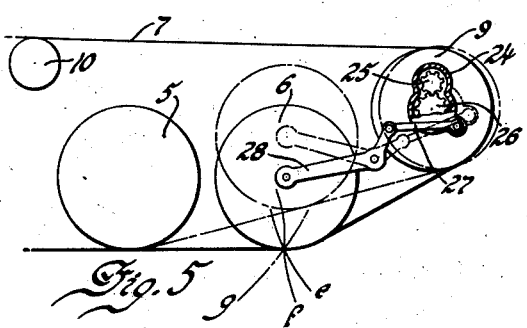
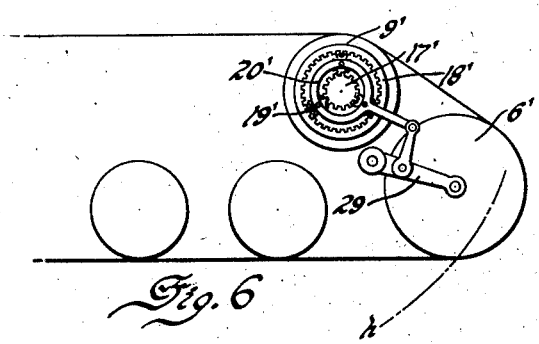
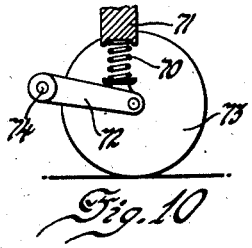
Inventors
Robert Schilling &
Henry O. Fuchs
By
Blackmore, Spencer & Flint
Attorneys Inventors
Robert Schilling &
Henry O. Fuchs
By Blackmore, Spencer & Olivet
Attorneys Patented Sept. 9, 1947

2,427,162

UNITED STATES PATENT OFFICE 2,427,162

TRACK DRIVE

Robert Schilling, Birmingham, and Henry O. Fuchs, Detroit, Mich., assignors to General Motors Corporation, Detroit, Mich., a corporation of Delaware Application April 24, 1944, Serial No. 532,442

17 Claims. (Cl. 305—9)

1

This invention relates to motor operated vehicles having ground engaging endless driving tracks on both sides. In such vehicles, the power plant generally is arranged to drive both tracks through a steering differential with mechanism to brake either or both tracks. With each track running over a drive sprocket at one end and an idler at the other end and with a series of tandem load carrying wheels engaging the lower branch of the track and spring supporting the body or hull of the vehicle, deflection of the load carrying springs puts slack in the tracks which may throw them out of driving relation and sudden changes in driving and braking forces cause the body to tilt either as a rearward squat or a forward dive as the case may be.

It is among the objects of the present invention to provide an improved track suspension and drive arrangement whereby track slack and body tilt can be substantially eliminated.

Figure 7:
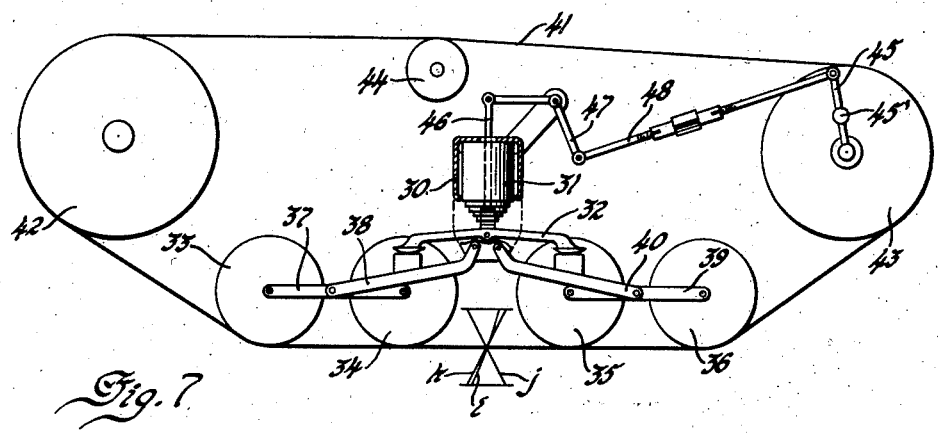
Figure 8:
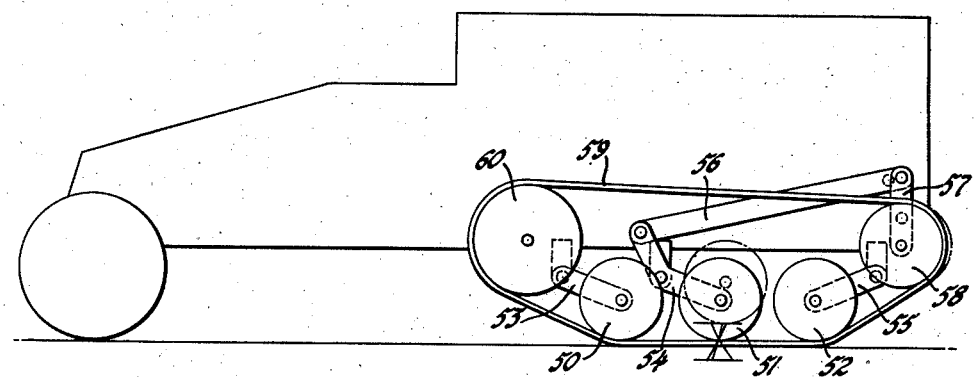
Figure 9:
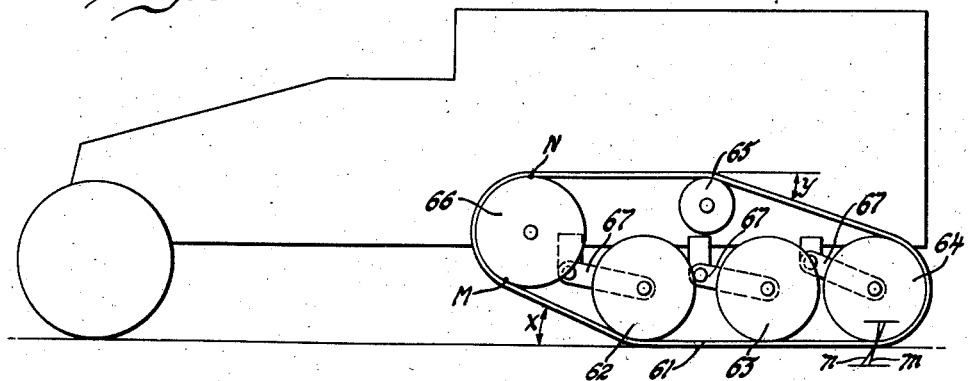

Other objects and advantages will become apparent during the course of the following specification having reference to the accompanying drawing wherein Figure 1 is a side elevation of a track vehicle showing a usual arrangement of track engaging wheels; Figure 2 is a diagrammatic representation of the forward portion of a conventional drive; Figure 3 is a view similar to Figure 2 illustrating the improved wheel control linkage; Figures 4, 5 and 6 illustrate alternate arrangements for interconnecting the drive sprocket with the mounting of an adjacent load carrying wheel; Figures 7, 8 and 9 illustrate modifications especially adapted for half track installation, and Figure 10 is a fragmentary side elevation illustrating the suitable spring suspension arrangement.

In the drawing the reference numeral 1 indicates the body or hull of a military tank supported upon a series of tandem load carrying wheels 2, 3, 4, 5 and 6. Any convenient type of spring suspension may be employed between the load carrying wheels and the body hull, the conventional springing being such as to permit each wheel to move up and down relative to the body. Where the wheels are sprung independently of one another, for example, each wheel may be mounted on the end of a swinging lever pivoted to the body with a coil spring interposed between the lever and body (see Figure 10). Each wheel runs on the lower branch of an endless flexible track or ground engaging belt 7 whose opposite end loops are trained over wheels 8 and 9 with the upper reach of the track supported and guided in its intermediate region by one or more supporting

2 rolls 10. The front end wheel 8 is located slightly above and in advance of the forward load carrying wheel 2 while the rear end wheel 9 is in back of and somewhat above the rearmost load carrying wheel 6 so that the lower reach of the track is inclined toward the ground at the front and away from the ground at the rear in order better to negotiate uneven terrain. The end wheels 8 and 9, which normally carry none of the weight of the vehicle, may be termed respectively an idler guide and a driver or sprocket, the latter being coupled with a drive shaft through which the power and braking torques are applied. Optionally the drive may be applied through the front wheel 8 with the rear wheel 9 then serving as an idler.

In Figure 3 the forward load carrying wheel 2 is shown connected with a lever arm 11 pivoted for vertical swinging motion on a fulcrum pin 12 carried by the hull. This lever arm preferably is an auxiliary to the spring suspension system, not shown, although it could form a part of the suspension system, in which case a coil or other type of spring will be interposed between the free end of the lever and the hull. It constitutes one arm of a bell crank whose other arm 13 is pivotally coupled with one end of a connecting rod or push-pull link 14 extending forwardly and being pivotally joined at its opposite end with the lower end of a dependent lever arm 15 journaled for longitudinal swinging motion on a hull carried mounting pin 16. Intermediate its length the lever 15 has rotatably mounted thereon the idler wheel 8.

By reason of the lever and link interconnection, vertical motion of the wheel 2 and longitudinal motion of the wheel 8 are compelled to occur automatically in unison with one being projected as the other is retracted. Thus deflection of the load carrying spring associated with the ground wheel 2, incident to loading of the vehicle or bounce or upward travel of the wheel relative to the hull when traveling uneven ground, will project the idler 8 to take up and eliminate excess slack in the endless track. In addition, any force applied through track tension sufficient to retract the idler will project the load carrying wheel 2 and react at the fulcrum 12 to lift the hull. Such condition is likely to be presented during vehicle travel when the brakes are applied suddenly. Application of braking forces at the rear driving sprocket 9 puts the upper reach of the track under considerable tension tending to pull back the swinging idler arm 15 and thereby push down the lever arm 11 for counteracting forward tilting forces and forestalling body dive.

Sudden change in the application of driving effort through the rear sprocket increases the tensioning of the lower reach of the track 7 and inasmuch as the driver 9 is positioned to the rear and above the adjacent load carrying wheel 6 with the track extending upwardly therebetween the tendency will be to pull the rear end of the vehicle toward the ground or cause what is generally termed body squat.

Considering a conventional layout without compensating linkage, but with the idler wheel in fixed position on the hull, variations in track slack produced by motion of the load carrying wheels is indicated in Figure 2 by the intersecting arcs $a$ and $b$. In other words, if the parts except for the forward load carrying wheel 2, are deemed to be stationary and the first load carrying wheel is moved up and down, a point on the track at the ground is free to follow the path $a$ which is very nearly an arc about a point A. It will also be free to follow the path $b$ circular to the point B and the slack or tension is shown by the difference between $a$ and $b$. By linking the lift and drop of the load carrying wheel to a forward motion of the idler, as heretofore described, the shift of idler position (see Figure 3) displaces the axis A and causes the path of the track to follow a line substantially as indicated at $a'$ which closely approximates the arc $b$ to reduce slack to an amount which can be considered negligible.

Compensating linkage may also be applied between the driver 9 and the adjacent load carrying wheel 6 either by itself or in combination with the front end compensator. Alternate arrangements are shown in Figures 4 and 5 both dealing with antidive and antisquat characteristics with that of Figure 5 also introducing slack take up for wheel deflection. In Figure 4 the shaft leading from the steering differential and through which power and braking torques are transmitted, carries a sun gear 17 to drive the sprocket 9. Fastened to the sprocket 9 is a ring gear 18 to which drive is transferred from the sun gear through a series of planetary gears 19 mounted on a carrier 20. An extension arm on the planet carrier is joined by the link 21 to the bell crank lever 22 and the latter is fulcrumed on the hull at 23 and connected at its swinging end with the track engaging load carrying wheel 6. The gearing provides for variations in rate of drive transmitted since rotation of the planet carrier in one direction speeds up the sprocket in relation to the sun gear and rotation in the other direction slows down the relative motion. Sudden application of power or increase of speed of the sun gear puts more tension on the upwardly and rearwardly inclined portion of the track 7 between the driver and ground wheel and then tends to deflect the wheel 6 and pull down the hull at the fulcrum 23 producing body squat. However, before such force is built up the resistance to track travel holds back the driving sprocket 9 and the planets are carried with the sun gear 17 in clockwise direction as viewed in Figure 4 and rotation of the carrier 20 transmitted through the link 21 rocks the lever 22 toward the ground for better traction with the reaction at the fulcrum 23 lifting the hull and this action balances the force tending to cause squat.

Brake dive is also reduced since forces resulting when the brake acts on the sun gear tend to lift the wheel 6 and depress the hull at the fulcrum 23. Thus when the brake is applied the pull in the upper reach of the track 7 serves to direct the planet gears counterclockwise on the brake responsive sun gear and rotation of the planet carrier 20 transmitted through the motion transmitting link 21 rocks the lever 22 to depress the load carrying spring and pull down on the hull at the point 23. This linkage does not move the driver fore and aft and, therefore, does not have any slack compensating action. It varies the rate of travel of the track in relation to the drive shaft rotation. The track feed for a given lift of a wheel is indicated by the distance between the arcs $c$ and $d$. The arc $d$ indicates the path which a point on the track might take if the driver 9 is fixed and if the wheel 6 is moved up and down without interconnection with the drive gearing. However, with the parts interconnected as shown, but with the sun gear held stationary, vertical motion of the wheel 6 is transmitted to the driver 9 and ring gear 18 and with the consequent feed of the track the path of the beforementioned point on the track follows the arc $c$. By proper choice of the linkage and the ratio in the planetary unit it is possible to arrange the path $c$ so that dive and squat are reduced to zero.

If it is desired to incorporate compensation for slack at the driving end of the vehicle the arrangement shown in Figure 5 may be employed. Here the drive shaft is located at the fulcrum around which the sprocket carrier 24 swings and drives the sprocket 9 through a set of spur gears 25 and 26. A connecting rod 27 joins the swinging sprocket carrier with a bell crank 28 connected with the wheel 6 so that the uncompensated path $e$ becomes the compensated path $f$ while the feed motion produces a track path indicated at $g$.

It is feasible to make a linkage that will compensate for relative motion of several or all of the load carrying wheels in all possible combinations, but this becomes complicated and seems unnecessary. Compensation of only the wheels nearest to the idler and driver, accomplishes nearly all that is desirable from a practical standpoint.

In the operation of the vehicle the inertia forces incident to changes in speed act at the center of gravity of the entire assembly. The so called centers for dive and squat, located in the vertical plane at the center of spring rates, can be determined and the angles of tilt will be proportional to the existing couples. Considering the vertical plane containing the center of spring rates as intersecting the axis of the wheel 4 centrally of the tandem train of load carrying wheels and assuming the vehicle to be at normal standing height with the rear sprocket locked by the braking force supplied to it, the path of the track without slack compensation will be given by the line $a$ in Figure 2. A line drawn normal to this path at the point of ground contact will intersect the vertical through the spring center at a point or dive center considerably below the ground and, consequently, the dive angle will be fairly large. A reduced angle is had with the compensated linkage of Figure 3 where the path of the track becomes $a'$. This line is substantially vertical and a normal to it will be practically horizontal so that the dive center lies at or near ground level. The squatting action during acceleration can be similarly determined. The track path under the rear wheel indicated at $c$ in Figure 4 and at $g$ in Figure 5, may have a line drawn normal thereto at ground contact and the intersection of that line with the center of spring rates will be the squat center. The squat angle then will be proportional to the distance between the center of gravity and the squatting center times the accelerating force. The object of the linkage and gearing arranged as described is to generate the arcs $c$ and $g$ so that a normal to either produces a squat center at the height of the center of gravity and shows no squat angle but a small parallel lift during acceleration.

The combination of slack compensation and track feed can be used on practically all track layouts to produce a drive without slack variation and with full antidive and antisquat. Figure 6 shows the principles applied to another layout. Here the front wheel may be treated the same as in Figure 3 but on the rear wheel 6' slack compensation is accomplished by the angular position of the wheel supporting arm 29 and track feed is produced by mechanism similar to that of Figure 4. In other words, the driver 9' has the ring gear 18' fixed thereto and driven from the sun gear 17' through the planets 19' the planets being mounted on a carrier 20'. Unison motion of the planet carrier and wheel 6' is effected by use of an interconnecting link between a lever arm extension on the planet carrier and the wheel supporting arm, respectively, with the result that the point of ground contact on the track under the wheel 6' at normal vehicle standing height will follow a path substantially as indicated by the line $h$. A normal to the path $h$ will be found to intersect the vertical plane containing the center of spring rates at the dive center adjacent the vehicle center of gravity.

While the drive mechanism has been described as intended primarily for use with a full track vehicle it will be understood that it can be applied to the so-called half track vehicle which as generally constructed has non-steerable rear track units and a conventional front automotive type steerable axle and wheel assembly. Figures 8 and 9 each illustrate a half track vehicle.

In Figure 7 an approved and well known form of wheel suspension system is shown in which a body bracket 30 houses one or more volute springs 31 bearing at opposite ends on the housing and the main rocker bar 32 of an equalizer link system connecting the tandem load carrying wheels 33, 34, 35 and 36. The linkage includes a secondary equalizer bar 37 connected at opposite ends to the axles of the wheels 33 and 34 and centrally pivoted on a lever 38 which is fulcrumed on the body bracket 30, together with the secondary equalizer bar 39 joining the axles of the wheels 35 and 36 and centrally connected with the lever 40 also fulcrumed on the body bracket 30. The levers 38 and 40 have intermediate bearing pads engaged by the opposite ends of the main rocker 32 whereby the load is spring suspended and distributed among the several independently deflectable wheels. The wheels, of course, run on the lower branch of the endless track 41 whose opposite end loops are trained about the longitudinally spaced non-load carrying wheels comprising a driver 42 and an idler 43 with one or more intermediate supporting rolls 44 for the upper track branch. In the conventional arrangement the driver and the idler are mounted on fixed axes so that upon parallel deflection of the load carrying wheels a point on the track at the center of the spring could follow the path $j$ in relation to idler position or a path $k$ with reference to driver position with the spacing between the two paths above the normal illustrated standing height representing slack and that below representing a tightening effect. According to the present invention it is proposed to superpose these two paths or more properly speaking to bring them into substantial agreement in a manner that the path $j$ will become the path $l$ with the extent to which the path is shifted representing the actual compensation which as illustrated is somewhat less than full compensation. In other words, it will be noted that the spacing between the paths $k$ and $l$ illustrates a slight under compensation which relation has been found best suited for practical operation. The result mentioned is achieved by compelling projection of idler position automatically with load wheel deflection and for this purpose the idler 43 has its axle carried by a rock lever 45 fulcrumed at 45' on the vehicle body and linked with the main suspension rocker 32. The motion transmitting linkage includes a vertical rod 46 guided in the frame bracket 30 and connected at opposite ends to the rocker 32 and the bell crank lever 47 with the latter joined by a connecting rod 48 with the idler mounting lever 45. Thus vertical travel of the load carrying wheels and longitudinal travel of the idler are caused to occur in unison and maintain substantially constant track distance around the several wheels.

In the arrangement shown in Figure 8 the load carrying wheels 50, 51 and 52 are mounted on distance arms 53, 54 and 55, respectively, suitable for independent springing. The distance arm 54 for the central wheel is linked by the rod 56 with a rocker 57 carrying the idler 58. The upper reach of the track 59 extends from the idler to the driver 60 with the lower reach running under the wheels 50, 51 and 52. Here track compensation follows the pattern as described in connection with the structure of Figure 7 but is under control of the central wheel only which, however, is at the center of spring rates for the drive unit.

Figure 9 shows the lower reach of the endless drive belt 61 tracking under the wheels 62, 63 and 64 and the upper reach running between the idler 65 and the driver 66 with a front track portion inclined downwardly and rearwardly between the driver 66 and wheel 62 and a rear track portion inclined upwardly and forwardly between the wheel 64 and idler 65. With this arrangement there occurs between the front inclined track portion and its lower reach an acute angle denoted $x$ and between the rear track portion and upper reach an acute angle $y$. By employing independent suspension for each road wheel and connecting the wheels with the body by control arms 67 extending downwardly and rearwardly from the body a substantially self-compensating system for parallel wheel deflection can be provided if the rearmost wheel 64 is mounted for swinging in an arc whose path is tilted upwardly and rearwardly with the downwardly inclined arm 67 positioned at normal standing height to make an acute angle with the horizontal equal substantially to one-half the sum of the angles $x$ and $y$. The amount of slack which then occurs will be negligible and is illustrated by the spacing between the arcs $m$ and $n$: the path $m$ being followed by a point on the track when the length of track between it and the point M on the driver is held taut and the path $n$ being followed by the same point when the length of track between it and the point N on the driver is held taut.

In Figure 10 there is shown a weight supporting coil spring 70 interposed between a hollow bracket 71 and the swinging end of the longitudinal lever arm 72 which carries the load wheel 73 and is fulcrumed on the hull at 74. This is illustrative of the type of spring suspension applicable to the several load carrying wheels shown in the preceding figures of the drawing.

We claim:

1. In an endless track vehicle, a body, a pair of non-load carrying wheels longitudinally spaced apart and mounted on the body, with the mounting of at least one of said wheels enabling its displacement longitudinally of the body, an endless track trained about said wheels, a series of tandem load carrying wheels engaging the lower reach of said track and flexibly supporting said body and motion transmitting means connecting a displaceable non-load carrying wheel with an adjacent load carrying wheel and compelling longitudinal displacement of one in unison with vertical displacement of the other whereby projection of one compensates for retraction of the other in maintaining track tension.

2. In an endless track vehicle, a body, a pair of longitudinally spaced non-load carrying wheels carried by the body for longitudinal movement relative thereto, a track trained about said wheels, a series of tandem wheels engaging the lower track branch and flexibly supporting the body and movable vertically relative thereto, and motion transmitting means connecting each non-load carrying wheel to its adjacent body supporting wheel and being arranged to compel unison motions of the non-load carrying wheel longitudinally and of the supporting wheel vertically.

3. In an endless track vehicle, a body having a driving wheel at one end and a non-load carrying idler wheel at its opposite end, an endless track trained on the wheels, a load carrying wheel flexibly supporting the body and engaging said track, means mounting the idler wheel for longitudinal adjustment and a motion transmitting linkage connecting said means with the load carrying wheel whereby retraction of one wheel projects the other and vice versa.

4. A track vehicle drive train including a pair of non-load carrying wheels at opposite ends, an endless track looped at opposite ends about said wheels, tandem load carrying wheels engaging the lower branch of the track intermediate said end wheels, a lever arm mounting one of the end wheels for longitudinal swinging movement, a lever arm mounting for vertical swinging movement, a load carrying wheel next adjacent said end wheel and push-pull linkage connecting said lever arms for their conjoint swinging action and projection of one coincident with retraction of the other.

5. A track vehicle drive train including a pair of non-load carrying wheels at opposite ends, an endless track looped at opposite ends about said wheels, tandem load carrying wheels engaging the lower branch of the track intermediate said end wheels, lever arms mounting both end wheels for longitudinal swinging movement, lever arms mounting said load carrying wheels for vertical swinging movement, and motion transmitting linkage connecting each longitudinally movable lever arm with its adjacent vertically movable lever arm for their projection and retraction in opposition.

6. The structure of claim 5 wherein one of the end wheels constitutes the track driver and has a driven gear secured thereto, and a driving gear meshing with the driven gear and being mounted coaxially with the fulcrum of the driver lever arm.

7. In an endless track drive, a load carrying wheel having a lever arm mounting the wheel for vertical swinging motion, a track driver wheel having a lever arm mounting the same for longitudinal swinging motion, a connecting rod joining the levers to transfer motion therebetween and being arranged to swing one lever outwardly coincident with the inward swinging of the other, a driven gear rigid with the driver in coaxial relation therewith and a driving gear in drive relation with the driven gear and in coaxial relation to the fulcrum of the lever arm which mounts the driver wheel.

8. In an endless track drive, a pair of juxtaposed track engaging wheels having a length of track extending between peripheral portions of the wheels spaced vertically of one another, one of the wheels being a load carrier and being mounted on a lever arm for vertical swinging motion which varies the track spacing between the wheels and the other being a driver and having a driven ring gear rigid therewith, a centrally disposed sun driving gear, a series of planet gears engaging the driving and driven gears, a planet gear carrier and a connecting rod between the carrier and lever arm, arranged to rock the carrier with lever arm motion and thereby vary the rate of drive transmission through the planet gears in compensation for variation in spacing of the track engaging portions of the wheels.

9. In a track driven vehicle, a pair of juxtaposed wheels between which a length of track extends upwardly, one of said wheels being a load carrying wheel mounted for vertical deflection which changes the track spacing between the wheels and the other wheel being a track driver wheel having its track engaging portion above the track engaging portion of the load carrying wheel, change speed drive transmitting mechanism for said driver wheel and an operative connection between said mechanism and said load carrying wheel for transmitting changes in drive transmission and wheel deflection one to the other whereby one change offsets the other.

10. In a track driven vehicle, a load carrying wheel, a suspension mounting said wheel for vertical adjustment, a track driver wheel, drive transmitting mechanism for said driver wheel including a movable control element responsive to changes in torque transmission and motion transmitting linkage operatively connecting said element with the wheel suspension mounting to vary the load carrying wheel adjustment in relation to torque changes.

11. In a track driven vehicle, a load carrying wheel, a flexible suspension mounting said wheel for vertical adjustment, a track driver wheel, an endless track entailed on said wheels, drive transmitting mechanism for said driver wheel, gearing between said mechanism and the driver wheel displaceable in position to accelerate the rate of drive and a motion transmitting linkage connecting said displaceable gearing and the load carrying wheel to transmit adjustment of one to the other.

12. In a track driven vehicle, an endless drive track a load carrying wheel, means flexibly suspending said wheel for vertical deflection, a track end loop guide and non-load carrying wheel adjacent and above the load carrying wheel, means mounting the end loop guide wheel for adjustment to maintain taut the track length between said wheels and a motion transmitting interconnection between said wheel suspension means and said wheel mounting means responsive to deflection of the load carrying wheel to adjust automatically the guide wheel.

13. In an endless track driven vehicle, a series of load carrying wheels in tandem relation, a body flexibly suspended by said wheels, a non-load carrying wheel movably mounted on the body, an endless track trained about the several wheels and a motion transmitting connection coupling said non-load carrying wheel with a load carrying wheel and transmitting relative up and down motion between said load carrying wheel and the body to the non-load carrying wheel for moving the same in compensation for said relative motion.

14. An endless track drive including a pair of end sprockets, an endless track looped around the sprockets, a series of load carrying wheels arranged in tandem to run on the ground engaging reach of the track, load transmitting equalizer linkage connecting said wheels and constituting a part of a spring suspension system and said drive being characterized by a rock lever mounting one of said sprockets for longitudinal swinging motion and motion transmitting connections between said lever and said equalizer linkage, constructed and arranged to compel sprocket projection in unison with wheel deflection.

15. An endless track drive including a pair of end sprockets, an endless track looped around the sprockets, a series of load carrying wheels arranged in tandem to run on the ground engaging reach of the track, and motion transmitting connections between a load carrying wheel and one of said end sprockets, so constructed and arranged as to move the sprocket longitudinally in opposition to vertical movement of said wheel.

16. In a track driven vehicle, an endless track, a vertically movable load carrying wheel engaging the track, a track engaging driver adapted to transmit driving and braking forces, a variable speed gear mechanism coupled with the driver for transmitting said forces thereto and operative to vary driver speed means controlling operative speed changing response of said gear mechanism and operative connection linking said means with said wheel for actuation in response to vertical motion of the wheel.

17. In a motor vehicle, a body, an endless drive track extending longitudinally of the body, a pair of longitudinally spaced non-load carrying wheels on the body engaging the upper reach of the track out of ground contact, means mounting at least one of the wheels for track adjustment longitudinally, a series of longitudinally spaced load carrying wheels engaged with the lower track reach in ground contact and mounted on the body for deflection relative thereto, and motion transmitting mechanism operatively connecting a non-load carrying adjustable wheel with at least one of the load carrying deflectable wheels to compel a longitudinal wheel adjustment in fixed relation with a vertical wheel deflection and maintain substantially constant the distance of the track circuit around the several wheels.

ROBERT SCHILLING.
HENRY O. FUCHS.

REFERENCES CITED

The following references are of record in the file of this patent:

UNITED STATES PATENTS

| Number | Name | Date |
| --- | --- | --- |
| 1,393,157 | Ollivier | Oct. 11, 1921 |
| 1,980,276 | Kegresse | Nov. 13, 1934 |
| 1,368,652 | Pennington et al. | Feb. 15, 1921 |
| 1,258,288 | Wickersham | Mar. 5, 1918 |
| 1,861,866 | Knox et al. | June 7, 1932 |